United States Patent
Page

(10) Patent No.: US 8,521,730 B1
(45) Date of Patent: Aug. 27, 2013

(54) SCORING DOCUMENTS IN A LINKED DATABASE

(75) Inventor: Lawrence Page, Stanford, CA (US)

(73) Assignee: The Board of Trustees of the Leland Stanford Junior University, Palo Alto, CA (US)

(*) Notice: Subject to any disclaimer, the term of this patent is extended or adjusted under 35 U.S.C. 154(b) by 0 days.

(21) Appl. No.: 13/483,859

(22) Filed: May 30, 2012

Related U.S. Application Data

(63) Continuation of application No. 12/698,803, filed on Feb. 2, 2010, now Pat. No. 8,195,651, which is a continuation of application No. 11/209,687, filed on Aug. 24, 2005, now abandoned, which is a continuation of application No. 09/895,174, filed on Jul. 2, 2001, now Pat. No. 7,058,628, which is a continuation of application No. 09/004,827, filed on Jan. 9, 1998, now Pat. No. 6,285,999.

(60) Provisional application No. 60/035,205, filed on Jan. 10, 1997.

(51) Int. Cl.
G06F 7/00 (2006.01)
G06F 17/30 (2006.01)

(52) U.S. Cl.
USPC .......................................................... 707/726

(58) Field of Classification Search
None
See application file for complete search history.

(56) References Cited

U.S. PATENT DOCUMENTS

| | | | |
|---|---|---|---|
| 4,953,106 A | 8/1990 | Gansner et al. | |
| 5,444,823 A | 8/1995 | Nguyen | |
| 5,446,891 A | 8/1995 | Kaplan et al. | |
| 5,450,535 A | 9/1995 | North | |
| 5,544,352 A | 8/1996 | Egger | |
| 5,594,897 A | 1/1997 | Goffman | |
| 5,748,954 A | 5/1998 | Mauldin | |
| 5,752,241 A | 5/1998 | Cohen | |
| 5,754,939 A | 5/1998 | Herz et al. | |
| 5,832,494 A | 11/1998 | Egger et al. | |
| 5,838,906 A | 11/1998 | Doyle et al. | |
| 5,848,407 A | 12/1998 | Ishikawa et al. | |
| 5,915,249 A | 6/1999 | Spencer | |
| 5,920,854 A | 7/1999 | Kirsch et al. | |
| 5,920,859 A | 7/1999 | Li | |
| 5,987,457 A | 11/1999 | Ballard | |
| 6,012,053 A | 1/2000 | Pant et al. | |
| 6,014,678 A | 1/2000 | Inoue et al. | |
| 6,070,158 A | 5/2000 | Kirsch et al. | |
| 6,112,202 A | 8/2000 | Kleinberg | |
| 6,134,532 A | 10/2000 | Lazarus et al. | |
| 6,163,778 A | 12/2000 | Fogg et al. | |

(Continued)

OTHER PUBLICATIONS

Yuwono et al., "Search and Ranking Algorithms for Locating Resources on the World Wide Web", IEEE 1996, pp. 164-171.

(Continued)

Primary Examiner — Uyen Le
(74) Attorney, Agent, or Firm — Harrity & Harrity, LLP

(57) ABSTRACT

A method assigns importance ranks to nodes in a linked database, such as any database of documents containing citations, the world wide web or any other hypermedia database. The rank assigned to a document is calculated from the ranks of documents citing it. In addition, the rank of a document is calculated from a constant representing the probability that a browser through the database will randomly jump to the document. The method is particularly useful in enhancing the performance of search engine results for hypermedia databases, such as the world wide web, whose documents have a large variation in quality.

17 Claims, 3 Drawing Sheets

(56) References Cited

U.S. PATENT DOCUMENTS

| | | | |
|---|---|---|---|
| 6,233,571 B1 | 5/2001 | Egger et al. |
| 6,269,368 B1 | 7/2001 | Diamond |
| 6,285,999 B1 | 9/2001 | Page |
| 6,389,436 B1 | 5/2002 | Chakrabarti et al. |
| 6,591,261 B1 | 7/2003 | Arthurs |
| 6,665,838 B1 | 12/2003 | Brown et al. |
| 6,799,176 B1 | 9/2004 | Page |
| 7,058,628 B1 | 6/2006 | Page |
| 7,269,587 B1 | 9/2007 | Page |
| 7,908,277 B1 | 3/2011 | Page |
| 8,126,884 B1 | 2/2012 | Page |
| 8,127,220 B1 | 2/2012 | Dean |
| 8,131,715 B1 | 3/2012 | Page |
| 8,131,717 B1 | 3/2012 | Page |
| 8,195,651 B1 | 6/2012 | Page |
| 2001/0002466 A1 | 5/2001 | Krasle |

OTHER PUBLICATIONS

L. Katz, "A new status index derived from sociometric analysis", 1953, Psychometricka, vol. 18, pp. 39-43.
C.H. Hubbell, "An input-output approach to clique identification sociometry", 1965, pp. 377-399.
Mizruchi et al., "Techniques for disaggregating centrality scores in social networks", 1996, Sociological Methodology, pp. 26-48.
E. Garfield, "Citation analysis as a tool in journal evaluation", 1972, Science, vol. 178, pp. 471-479.
Pinski et al., "Citation influence for journal aggregates of scientific publications: Theory, with application to the literature of physics", 1976, Inf. Proc. and Management, vol. 12, pp. 297-312.
N. Geller, "On the citation influence methodology of Pinski and Narin", 1978, Inf. Proc. and Management, vol. 14, pp. 93-95.
P. Doreian, "Measuring the relative standing of disciplinary journals", 1988, Inf. Proc. and Management, vol. 24, pp. 45-56.
Office Action from U.S. Appl. No. 11/671,363 dated Jan. 26, 2009, 23 pages.
Office Action from U.S. Appl. No. 11/835,316 dated Jan. 26, 2009, 10 pages.
P. Doreian, "A measure of standing for citation networks within a wider environment", 1994, Inf. Proc. and Management, vol. 30, pp. 21-31.
Botafogo et al., "Structural analysis of hypertext: Identifying hierarchies and useful metrics", 1992, ACM Trans. Inc. Systems, vol. 10, pp. 142-180.
Mark E. Frisse, "Searching for information in a hypertext medical handbook", 1988, Communications of the ACM, vol. 31, No. 7, pp. 880-886.
Massimo Marchiori, "The quest for correct information on the Web: Hyper search engines", 1997, Computer Networks and ISDN Systems, vol. 29, No. 8-13, pp. 1225-1235.
Oliver A. McBryan, "GENVL and WWWW: Tools for taming the web", 1994, Proceedings of the first International World Wide Web Conference, pp. 1-13.
Carriere et al., "Web Query: Searching and visualizing the web through connectivity", 1997, Proc. 6$^{th}$ International World Wide Web Conference, pp. 1-14.
Arocena et al., "Applications of a web query language", 1997, Computer Networks and ISDN Systems, vol. 29, No. 8-13, pp. 1305-1316.
Jon M. Kleinberg, "Authoritative sources in a hyperlinked environment", 1998, Proc. of the 9$^{th}$ Annual ACM-SIAM Symposium on Discrete Algorithms, pp. 668-677.
Henzinger et al., "Measuring index quality using random walks on the web", 1999, Proc. of the 8$^{th}$ International World Wide Web Conference, pp. 213-225.
Craig Boyle, "To link or not to link: An empirical comparison of Hypertext linking strategies", ACM, 1992, pp. 221-231.
S. Jeromy Carriere et al., "Web Query: Searching and Visualizing the Web through Connectivity", Computer Networks and ISDN Systems 29 (1997), pp. 1257-1267.
J. Kleinberg, "Authoritative Sources in a Hyperlinked Environment", IBM Research Report, RJ 10076 (91892), May 29, 1997; 37 pages.
Recker et al.; "Predicting Document Access in Large Multimedia Repositories"; ACM Transactions on Computer-Human Interaction; vol. 3, No. 4; Dec. 1996; pp. 352-375.
Peter Pirolli et al.; "Silk from a Sow's Ear: Extracting Usable Structures from the Web"; Xerox Palo Alto Research Center; Conference on Human Factors in Computing Systems (CHI 96); Apr. 1996 (Canada); 8 pages.
Office Action from U.S. Appl. No. 09/004,827 dated Mar. 9, 2000, 11 pages.
Office Action from U.S. Appl. No. 09/899,068 dated Mar. 25, 2003, 14 pages.
Office Action from U.S. Appl. No. 09/004,827 dated Jun. 12, 2000, 12 pages.
Office Action from U.S. Appl. No. 09/895,174 dated Jun. 15, 2005, 11 pages.
Office Action from U.S. Appl. No. 09/004,827 dated Aug. 26, 1999, 7 pages.
Office Action from U.S. Appl. No. 09/895,174 dated Sep. 29, 2004, 13 pages.
Office Action from U.S. Appl. No. 09/899,068 dated Oct. 2, 2003, 13 pages.
Office Action from U.S. Appl. No. 09/004,827 dated Dec. 5, 2000, 10 pages.
Office Action from U.S. Appl. No. 09/734,883 dated Oct. 3, 2005, 20 pages.
Office Action from U.S. Appl. No. 09/734,883 dated Jan. 27, 2005, 17 pages.
Office Action from U.S. Appl. No. 09/734,883 dated Feb. 26, 2004, 15 pages.
Office Action from U.S. Appl. No. 09/734,883 dated Jan. 24, 2008, 28 pages.
Wang et al., "Prefetching in World Wide Web", IEEE 1996, pp. 28-32.
Mike Perkowitz, Previous Work, Mar. 2, 1999, available at http://www8.org/w8-papers/2bcustomizing/towards/node3.html, pp. 1-2.
Danny Sullivan, Internet Explorer 5 Makes Search Easier, Apr. 5, 1999, available at The Search Engine Report at http://searchenginewatch.com/showPage.html?page=sew_printer&id=2167121, pp. 1-6.
Danny Sullivan, Alexa Upgrades for Internet Explorer, Jun. 2, 1999, available at The Search Engine Report at http://searchenginewatch.com/showPage.html?page=sew_printer&id=2167191, pp. 1-3.
Masahiro Morita, "Information Filtering Based on User Behavior Analysis and Best Match Retrieval"; Springer-Verlag Publishers; 1994; pp. 272-281.
Robert Armstrong; WebWatcher: A Learning Apprentice for the World Wide Web; Carnegie Mellon University, School of Computer Science; Feb. 1, 1995; pp. 1-7.
S. Brin et al., "The Anatomy of a Large-Scale Hypertextual Web Search Engine"; Proceedings of the Seventh Annual International World Wide Web Conference; 1998; pp. 107-117.
Henry Lieberman; "Letizia: An Agent that Assists Web Browsing"; Proceedings of the Fourteenth International Joint Conference on Artificial Intelligence; 1995; 6 pages.
Elisabeth Andre et al.; "AiA: Adaptive Communication Assistant for Effective Infobahn Access"; German Research Center for Artificial Intelligence (DFKI); Mar. 20, 1997; 30 pages.
McSherry; "A Uniform Approach to Accelerated PageRank Computation"; ACM, 2005; pp. 575-582.
Office Action from U.S. Appl. No. 09/734,883 dated May 3, 2007, 26 pages.
Office Action from U.S. Appl. No. 09/734,883 dated Oct. 5, 2006, 29 pages.
Office Action from U.S. Appl. No. 09/734,883 dated Mar. 20, 2006, 24 pages.
Ramer et al., "Similarity, Probability and Database Organisation: Extended Abstract", IEEE 1996, pp. 272-276.
Office Action from U.S. Appl. No. 11/835,314 dated Jan. 26, 2009, 8 pages.
Botafogo et al., "Identifying Aggregates in Hypertext Structures," Human-Computer Interaction Laboratory & Department of Computer Science, University of Maryland, Dec. 1991, pp. 63-74.

Botafogo, "Cluster Analysis for Hypertext Systems," C&C Information Technology Research Laboratories, NEC Corporation, 1993, pp. 116-125.

Stieger, "Making Use of Hypertext Links when Retrieving Information," Swiss Federal Institute of Technology (ETH) Zurich, Department of Computer Science, Nov. 30-Dec. 4, 1992, pp. 102-111.

Baase, "Computer Algorithms—Introduction to Design and Analysis," San Diego State University, Jul. 1988, 36 pages.

Lucarella, "A Model for Hypertext-Based Information Retrieval," Dipartimento di Scienźe dell'Informazione, Universitá degli Studi di Milano, Cambridge University Press New York, 1992, pp. 81-94.

Fox, "Extending the Boolean and Vector Space Models of Information Retrieval with P-Norm Queries and Multiple Concept Types," UMI Dissertation Information Service, University Microfilms International, Information to Users, Cornell University, 1983, 385 pages.

Schatz et al., "NCSA Mosaic and the World Wide Web: Global Hypermedia Protocols for the Internet," Science, New Series, vol. 265, No. 5174, Aug. 12, 1994, pp. 895-901.

Conklin, "Hypertext: An Introduction and Survey," Microelectronics and Computer Technology Corp., Sep. 1987, pp. 17-41.

Pitkow et al., "WebViz: A Tool for WWW Access Log Analysis," Graphics, Visualization and Usability Center, College of Computing, Georgia Institute of Technology, First International World-Wide Web Conference, Advance Proceedings, May 25-27, 1994, Geneva, 11 pages.

Garner et al., "Three Drexel Information Science Research Studies—A Computer Oriented, Graph Theoretic Analysis of Citation Index Structures," Drexel Press 1967, 54 pages.

Salton, "Associative Document Retrieval Techniques Using Bibliographic Information," Harvard University, Jul. 1962, pp. 440-457.

Cleveland, "An $n$-Dimensional Retrieval Model," Journal of the American Society for Information Science, vol. 27, No. 5, Sep.-Oct. 1976, 7 pages.

Tapper, "The Use of Citation Vectors for Legal Information Retrieval," Journal of Law and Information Science, vol. 1, No. 2, 1982, 34 pages.

Salton et al., "Approaches to Text Retrieval for Structured Documents," TR 90-1083, Jan. 11, 1990, Department of Computer Science, Cornell University, 20 pages.

Can et al., "A Dynamic Cluster Maintenance System for Information Retrieval," 1987, pp. 123-131.

Garfield, "Essay of an Information Scientist: of Nobel Class, Women in Science, Citation Classics, and other Essays," Contract Research Services at ISI-Citation Analysis for Governmental, Industrial, and Academic Clients, vol. 15, No. 23, pp. 75-83, Jun. 8, 1992.

Office Action from U.S. Appl. No. 12/689,846 dated Jan. 21, 2011, 13 pages.

Office Action from U.S. Appl. No. 12/695,713 dated Feb. 4, 2011, 12 pages.

Co-pending U.S. Appl. No. 13/616,965 entitled "Scoring Documents in a Linked Database", by Lawrence Page, filed Sep. 14, 2012, 21 pages.

Office Action from U.S. Appl. No. 11/209,687 dated Oct. 6, 2008, 6 pages.

Office Action from U.S. Appl. No. 11/209,687 dated Jan. 22, 2009, 24 pages.

Office Action from U.S. Appl. No. 11/208,597 dated Oct. 6, 2008, 6 pages.

Office Action from U.S. Appl. No. 11/208,597 dated Jan. 23, 2009, 15 pages.

SCORING DOCUMENTS IN A LINKED DATABASE

CROSS-REFERENCES TO RELATED APPLICATIONS

This application is a continuation of U.S. patent application Ser. No. 12/698,803, filed Feb. 2, 2010, now U.S. Pat. No. 8,195,651, which is a continuation of U.S. patent application Ser. No. 11/209,687, filed Aug. 24, 2005 (now abandoned) which is a continuation of U.S. patent application Ser. No. 09/895,174, filed Jul. 2, 2001, now U.S. Pat. No. 7,058,628, which is a continuation of U.S. patent application Ser. No. 09/004,827, filed Jan. 9, 1998, now U.S. Pat. No. 6,285,999, which claims priority from U.S. provisional patent application No. 60/035,205 filed Jan. 10, 1997, which are all incorporated herein by reference.

STATEMENT REGARDING GOVERNMENT SUPPORT

This invention was made with Government support under contract 9411306 awarded by the National Science Foundation. The Government has certain rights in the invention.

FIELD OF THE INVENTION

This invention relates generally to techniques for analyzing linked databases. More particularly, it relates to methods for assigning ranks to nodes in a linked database, such as any database of documents containing citations, the world wide web or any other hypermedia database.

BACKGROUND OF THE INVENTION

Due to the developments in computer technology and its increase in popularity, large numbers of people have recently started to frequently search huge databases. For example, internet search engines are frequently used to search the entire world wide web. Currently, a popular search engine might execute over 30 million searches per day of the indexable part of the web, which has a size in excess of 500 Gigabytes. Information retrieval systems are traditionally judged by their precision and recall. What is often neglected, however, is the quality of the results produced by these search engines. Large databases of documents such as the web contain many low quality documents. As a result, searches typically return hundreds of irrelevant or unwanted documents which camouflage the few relevant ones. In order to improve the selectivity of the results, common techniques allow the user to constrain the scope of the search to a specified subset of the database, or to provide additional search terms. These techniques are most effective in cases where the database is homogeneous and already classified into subsets, or in cases where the user is searching for well known and specific information. In other cases, however, these techniques are often not effective because each constraint introduced by the user increases the chances that the desired information will be inadvertently eliminated from the search results.

Search engines presently use various techniques that attempt to present more relevant documents. Typically, documents are ranked according to variations of a standard vector space model. These variations could include (a) how recently the document was updated, and/or (b) how close the search terms are to the beginning of the document. Although this strategy provides search results that are better than with no ranking at all, the results still have relatively low quality. Moreover, when searching the highly competitive web, this measure of relevancy is vulnerable to "spamming" techniques that authors can use to artificially inflate their document's relevance in order to draw attention to it or its advertisements. For this reason search results often contain commercial appeals that should not be considered a match to the query. Although search engines are designed to avoid such ruses, poorly conceived mechanisms can result in disappointing failures to retrieve desired information.

Hyperlink Search Engine, developed by IDD Information Services, (http://rankdex.gari.com/) uses backlink information (i.e., information from pages that contain links to the current page) to assist in identifying relevant web documents. Rather than using the content of a document to determine relevance, the technique uses the anchor text of links to the document to characterize the relevance of a document. The idea of associating anchor text with the page the text points to was first implemented in the World Wide Web Worm (Oliver A. McBryan, GENVL and WWWW: Tools for Taming the Web, First International Conference on the World Wide Web, CERN, Geneva, May 25-27, 1994). The Hyperlink Search Engine has applied this idea to assist in determining document relevance in a search. In particular, search query terms are compared to a collection of anchor text descriptions that point to the page, rather than to a keyword index of the page content. A rank is then assigned to a document based on the degree to which the search terms match the anchor descriptions in its backlink documents.

The well known idea of citation counting is a simple method for determining the importance of a document by counting its number of citations, or backlinks. The citation rank r(A) of a document which has n backlink pages is simply $$r(A)=n.$$

In the case of databases whose content is of relatively uniform quality and importance it is valid to assume that a highly cited document should be of greater interest than a document with only one or two citations. Many databases, however, have extreme variations in the quality and importance of documents. In these cases, citation ranking is overly simplistic. For example, citation ranking will give the same rank to a document that is cited once on an obscure page as to a similar document that is cited once on a well-known and highly respected page.

SUMMARY

Various aspects of the present invention provide systems and methods for ranking documents in a linked database. One aspect provides an objective ranking based on the relationship between documents. Another aspect of the invention is directed to a technique for ranking documents within a database whose content has a large variation in quality and importance. Another aspect of the present invention is to provide a document ranking method that is scalable and can be applied to extremely large databases such as the world wide web. Additional aspects of the invention will become apparent in view of the following description and associated figures.

The present invention achieves the above objects by taking advantage of the linked structure of a database to assign a rank to each document in the database, where the document rank is a measure of the importance of a document. Rather than determining relevance from the intrinsic content of a document, or from the anchor text of backlinks to the document, the present method determines importance from the extrinsic relationships between documents. Intuitively, a document should be important (regardless of its content) if it is highly cited by other documents. Not all citations, however, are of equal significance. A citation from an important document is more important than a citation from a relatively unimportant document. Thus, the importance of a page, and hence the rank assigned to it, should depend not just on the number of citations it has, but on the importance of the citing documents as well. This implies a recursive definition of rank: the rank of a document is a function of the ranks of the documents which cite it. The ranks of documents may be calculated by an iterative procedure on a linked database.

Because citations, or links, are ways of directing attention, the important documents correspond to those documents to which the most attention is directed. Thus, a high rank indicates that a document is considered valuable by many people or by important people. Most likely, these are the pages to which someone performing a search would like to direct his or her attention. Looked at another way, the importance of a page is directly related to the steady-state probability that a random web surfer ends up at the page after following a large number of links. Because there is a larger probability that a surfer will end up at an important page than at an unimportant page, this method of ranking pages assigns higher ranks to the more important pages.

In one aspect of the invention, a computer implemented method is provided for calculating an importance rank for N linked nodes of a linked database. The method comprises the steps of:

(a) selecting an initial N-dimensional vector $p_0$;

(b) computing an approximation $p_n$ to a steady-state probability $p_\infty$ in accordance with the equation $p_n = A^n p_0$, where A is an N×N transition probability matrix having elements A[i][j] representing a probability of moving from node i to node j; and (c) determining a rank r[k] for a node k from a $k^{th}$ component of $p_n$.

In a preferred embodiment, the matrix A is chosen so that an importance rank of a node is calculated, in part, from a weighted sum of importance ranks of backlink nodes of the node, where each of the backlink nodes is weighted in dependence upon the total number of links in the backlink node. In addition, the importance rank of a node is calculated, in part, from a constant α representing the probability that a surfer will randomly jump to the node. The importance rank of a node can also be calculated, in part, from a measure of distances between the node and backlink nodes of the node. The initial N-dimensional vector $p_0$ may be selected to represent a uniform probability distribution, or a non-uniform probability distribution which gives weight to a predetermined set of nodes.

DETAILED DESCRIPTION

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention. For support in reducing the present invention to practice, the inventor acknowledges Sergey Brin, Scott Hassan, Rajeev Motwani, Alan Steremberg, and Terry Winograd.

Figure 1:
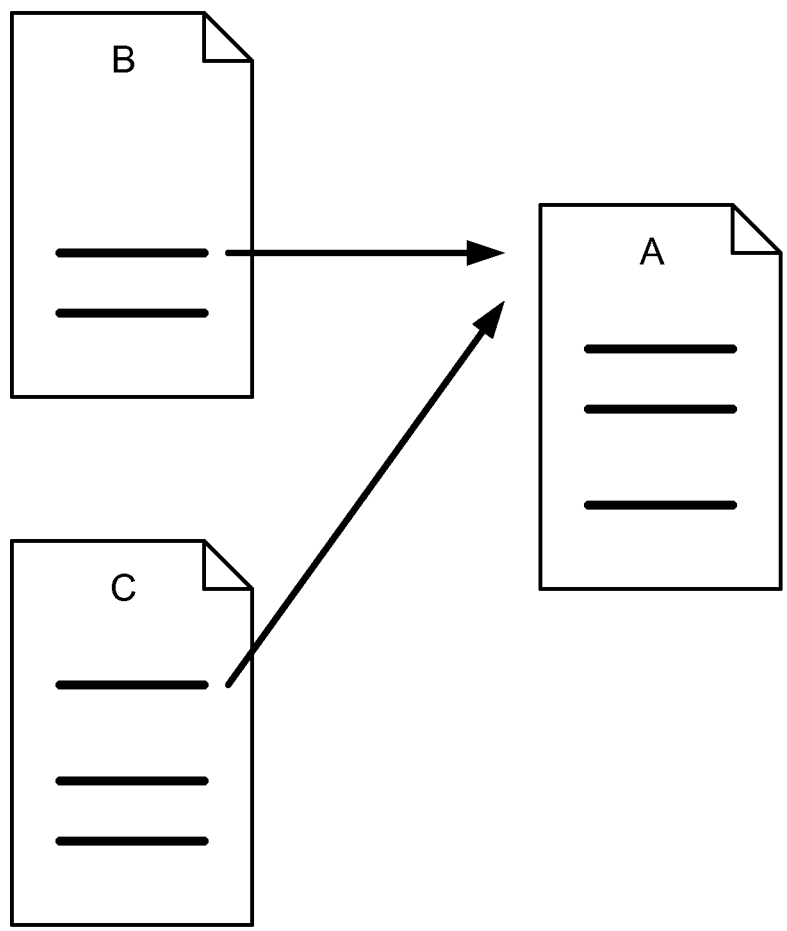
FIG. 1 is a diagram of the relationship between three linked hypertext documents according to the invention.

A linked database (i.e. any database of documents containing mutual citations, such as the world wide web or other hypermedia archive, a dictionary or thesaurus, and a database of academic articles, patents, or court cases) can be represented as a directed graph of N nodes, where each node corresponds to a web page document and where the directed connections between nodes correspond to links from one document to another. A given node has a set of forward links that connect it to children nodes, and a set of backward links that connect it to parent nodes. FIG. 1 shows a typical relationship between three hypertext documents A, B, and C. As shown in this particular figure, the first links in documents B and C are pointers to document A. In this case we say that B and C are backlinks of A, and that A is a forward link of B and of C. Documents B and C also have other forward links to documents that are not shown.

Although the ranking method of the present invention is superficially similar to the well known idea of citation counting, the present method is more subtle and complex than citation counting and gives far superior results. In a simple citation ranking, the rank of a document A which has n backlink pages is simply $$r(A) = n.$$

According to one embodiment of the present method of ranking, the backlinks from different pages are weighted differently and the number of links on each page is normalized. More precisely, the rank of a page A is defined according to the present invention as $$r(A) = \frac{\alpha}{N} + (1-\alpha)\left(\frac{r(B_1)}{|B_1|} + \ldots + \frac{r(B_n)}{|B_n|}\right),$$

where $B_1, \ldots, B_n$ are the backlink pages of A, $r(B_1), \ldots, r(B_n)$ are their ranks, $|B_1|, \ldots, |B_n|$ are their numbers of forward links, and α is a constant in the interval [0,1], and N is the total number of pages in the web. This definition is clearly more complicated and subtle than the simple citation rank. Like the citation rank, this definition yields a page rank that increases as the number of backlinks increases. But the present method considers a citation from a highly ranked backlink as more important than a citation from a lowly ranked backlink (provided both citations come from backlink documents that have an equal number of forward links). In the present invention, it is possible, therefore, for a document with only one backlink (from a very highly ranked page) to have a higher rank than another document with many backlinks (from very low ranked pages). This is not the case with simple citation ranking.

The ranks form a probability distribution over web pages, so that the sum of ranks over all web pages is unity. The rank of a page can be interpreted as the probability that a surfer will be at the page after following a large number of forward links. The constant α in the formula is interpreted as the probability that the web surfer will jump randomly to any web page instead of following a forward link. The page ranks for all the pages can be calculated using a simple iterative algorithm, and corresponds to the principal eigenvector of the normalized link matrix of the web, as will be discussed in more detail below.

Figure 2:
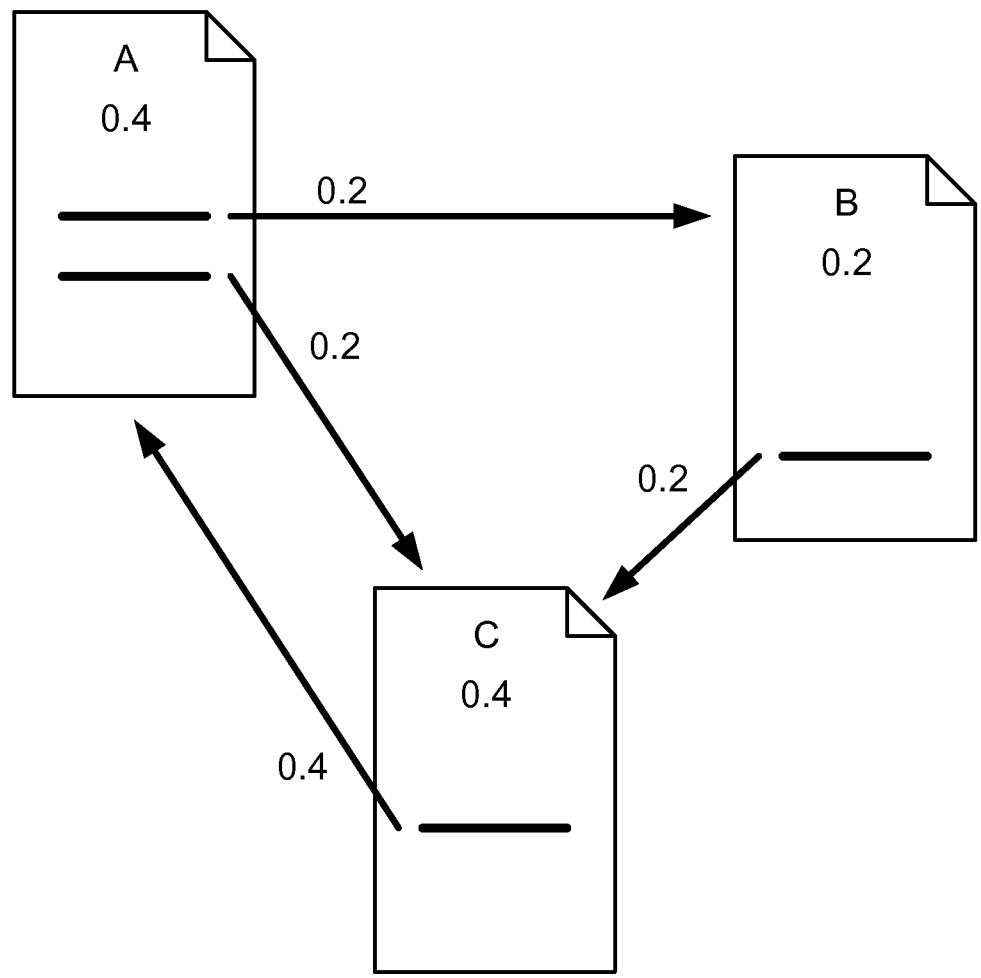
FIG. 2 is a diagram of a three-document web illustrating the rank associated with each document in accordance with the present invention.

In order to illustrate the present method of ranking, consider the simple web of three documents shown in FIG. 2. For simplicity of illustration, we assume in this example that r=0. Document A has a single backlink to document C, and this is the only forward link of document C, so $r(A)=r(C)$.

Document B has a single backlink to document A, but this is one of two forward links of document A, so $r(B)=r(A)/2$.

Document C has two backlinks. One backlink is to document B, and this is the only forward link of document B. The other backlink is to document A via the other of the two forward links from A. Thus $r(C)=r(B)+r(A)/2$.

In this simple illustrative case we can see by inspection that r(A)=0.4, r(B)=0.2, and r(C)=0.4. Although a typical value for α is ~0.1, if for simplicity we set α=0.5 (which corresponds to a 50% chance that a surfer will randomly jump to one of the three pages rather than following a forward link), then the mathematical relationships between the ranks become more complicated. In particular, we then have $r(A)=1/6+r(C)/2$, $r(B)=1/6+r(A)/4$, and $r(C)=1/6+r(A)/4+r(B)/2$.

The solution in this case is r(A)=14/39, r(B)=10/39, and r(C)=15/39.

In practice, there are millions of documents and it is not possible to find the solution to a million equations by inspection. Accordingly, in the preferred embodiment a simple iterative procedure is used. As the initial state we may simply set all the ranks equal to 1/N. The formulas are then used to calculate a new set of ranks based on the existing ranks. In the case of millions of documents, sufficient convergence typically takes on the order of 100 iterations. It is not always necessary or even desirable, however, to calculate the rank of every page with high precision. Even approximate rank values, using two or more iterations, can provide very valuable, or even superior, information.

The iteration process can be understood as a steady-state probability distribution calculated from a model of a random surfer. This model is mathematically equivalent to the explanation described above, but provides a more direct and concise characterization of the procedure. The model includes (a) an initial N-dimensional probability distribution vector $p_0$ where each component $p_0[i]$ gives the initial probability that a random surfer will start at a node i, and (b) an N×N transition probability matrix A where each component A[i][j] gives the probability that the surfer will move from node i to node j. The probability distribution of the graph after the surfer follows one link is $p_1=Ap_0$, and after two links the probability distribution is $p_2=Ap_1=A^2p_0$. Assuming this iteration converges, it will converge to a steady-state probability $$p_\infty = \lim_{n \to \infty} A^n p_0$$

which is a dominant eigenvector of A. The iteration circulates the probability through the linked nodes like energy flows through a circuit and accumulates in important places. Because pages with no links occur in significant numbers and bleed off energy, they cause some complication with computing the ranking. This complication is caused by the fact they can add huge amounts to the "random jump" factor. This, in turn, causes loops in the graph to be highly emphasized which is not generally a desirable property of the model. In order to address this problem, these childless pages can simply be removed from the model during the iterative stages, and added back in after the iteration is complete. After the childless pages are added back in, however, the same number of iterations that was required to remove them should be done to make sure they all receive a value. (Note that in order to ensure convergence, the norm of $p_i$ must be made equal to 1 after each iteration.) An alternate method to control the contribution of the childless nodes is to only estimate the steady state by iterating a small number of times.

The rank r[i] of a node i can then be defined as a function of this steady-state probability distribution. For example, the rank can be defined simply by $r[i]=p_\infty[i]$. This method of calculating rank is mathematically equivalent to the iterative method described first. Those skilled in the art will appreciate that this same method can be characterized in various different ways that are mathematically equivalent. Such characterizations are obviously within the scope of the present invention. Because the rank of various different documents can vary by orders of magnitude, it is convenient to define a logarithmic rank $$r[i] = \log \frac{p_\infty[i]}{\min_{k \in [1,N]} \{p_\infty[k]\}}$$

which assigns a rank of 0 to the lowest ranked node and increases by 1 for each order of magnitude in importance higher than the lowest ranked node.

Figure 3:
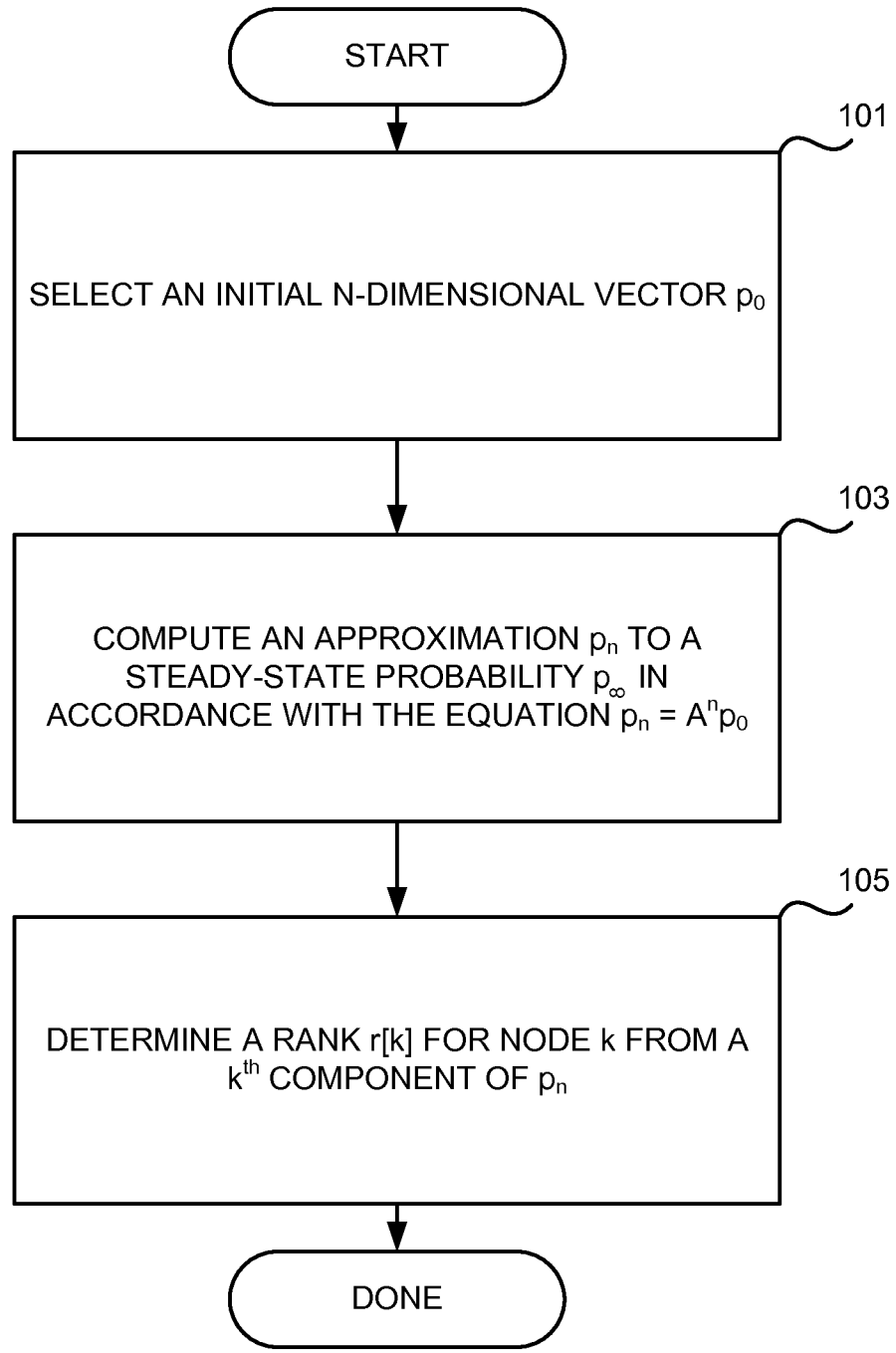
FIG. 3 is a flowchart of one implementation of the invention.

FIG. 3 shows one embodiment of a computer implemented method for calculating an importance rank for N linked nodes of a linked database. At a step 101, an initial N-dimensional vector $p_0$ is selected. An approximation $p_n$ to a steady-state probability $p_\infty$ in accordance with the equation $p_n=A^n p_0$ is computed at a step 103. Matrix A can be an N×N transition probability matrix having elements A[i][j] representing a probability of moving from node i to node j. At a step 105, a rank r[k] for node k from a $k^{th}$ component of $p_n$ is determined.

In one particular embodiment, a finite number of iterations are performed to approximate $p_\infty$. The initial distribution can be selected to be uniform or non-uniform. A uniform distribution would set each component of $p_0$ equal to 1/N. A non-uniform distribution, for example, can divide the initial probability among a few nodes which are known a priori to have relatively large importance. This non-uniform distribution decreases the number of iterations required to obtain a close approximation to $p_\infty$ and also is one way to reduce the effect of artificially inflating relevance by adding unrelated terms.

In another particular embodiment, the transition matrix A is given by $$A = \frac{\alpha}{N} 11 + (1-\alpha)B,$$

where 11 is an N×N matrix consisting of all 1s, α is the probability that a surfer will jump randomly to any one of the N nodes, and B is a matrix whose elements B[i][j] are given by $$B[i][j] = \begin{cases} \frac{1}{n_i} & \text{if node } i \text{ points to node } j \\ 0 & \text{otherwise,} \end{cases}$$

where $n_i$ is the total number of forward links from node i. The (1-α) factor acts as a damping factor that limits the extent to which a document's rank can be inherited by children documents. This models the fact that users typically jump to a different place in the web after following a few links. The value of α is typically around 15%. Including this damping is important when many iterations are used to calculate the rank so that there is no artificial concentration of rank importance within loops of the web. Alternatively, one may set α=0 and only iterate a few times in the calculation.

Consistent with the present invention, there are several ways that this method can be adapted or altered for various purposes. As already mentioned above, rather than including the random linking probability α equally among all nodes, it can be divided in various ways among all the sites by changing the 11 matrix to another matrix. For example, it could be distributed so that a random jump takes the surfer to one of a few nodes that have a high importance, and will not take the surfer to any of the other nodes. This can be very effective in preventing deceptively tagged documents from receiving artificially inflated relevance. Alternatively, the random linking probability could be distributed so that random jumps do not happen from high importance nodes, and only happen from other nodes. This distribution would model a surfer who is more likely to make random jumps from unimportant sites and follow forward links from important sites. A modification to avoid drawing unwarranted attention to pages with artificially inflated relevance is to ignore local links between documents and only consider links between separate domains. Because the links from other sites to the document are not directly under the control of a typical web site designer, it is then difficult for the designer to artificially inflate the ranking. A simpler approach is to weight links from pages contained on the same web server less than links from other servers. Also, in addition to servers, internet domains and any general measure of the distance between links could be used to determine such a weighting.

Additional modifications can further improve the performance of this method. Rank can be increased for documents whose backlinks are maintained by different institutions and authors in various geographic locations. Or it can be increased if links come from unusually important web locations such as the root page of a domain.

Links can also be weighted by their relative importance within a document. For example, highly visible links that are near the top of a document can be given more weight. Also, links that are in large fonts or emphasized in other ways can be given more weight. In this way, the model better approximates human usage and authors' intentions. In many cases it is appropriate to assign higher value to links coming from pages that have been modified recently since such information is less likely to be obsolete.

Various implementations of the invention have the advantage that the convergence is very fast (a few hours using current processors) and it is much less expensive than building a full-text index. This speed allows the ranking to be customized or personalized for specific users. For example, a user's home page and/or bookmarks can be given a large initial importance, and/or a high probability of a random jump returning to it. This high rating essentially indicates to the system that the person's homepage and/or bookmarks does indeed contain subjects of importance that should be highly ranked. This procedure essentially trains the system to recognize pages related to the person's interests.

The present method of determining the rank of a document can also be used to enhance the display of documents. In particular, each link in a document can be annotated with an icon, text, or other indicator of the rank of the document that each link points to. Anyone viewing the document can then easily see the relative importance of various links in the document.

The present method of ranking documents in a database can also be useful for estimating the amount of attention any document receives on the web since it models human behavior when surfing the web. Estimating the importance of each backlink to a page can be useful for many purposes including site design, business arrangements with the backlinkers, and marketing. The effect of potential changes to the hypertext structure can be evaluated by adding them to the link structure and recomputing the ranking.

Real usage data, when available, can be used as a starting point for the model and as the distribution for the alpha factor. This can allow this ranking model to fill holes in the usage data, and provide a more accurate or comprehensive picture. Thus, although this method of ranking does not necessarily match the actual traffic, it nevertheless measures the degree of exposure a document has throughout the web.

Another application and embodiment of the present invention is directed to enhancing the quality of results from web search engines. In this application of the present invention, a ranking method according to the invention is integrated into a web search engine to produce results far superior to existing methods in quality and performance. A search engine employing a ranking method of the present invention provides automation while producing results comparable to a human maintained categorized system. In this approach, a web crawler explores the web and creates an index of the web content, as well as a directed graph of nodes corresponding to the structure of hyperlinks. The nodes of the graph (i.e., pages of the web) are then ranked according to importance as described above in connection with various exemplary embodiments of the present invention.

The search engine is used to locate documents that match the specified search criteria, either by searching full text, or by searching titles only. In addition, the search can include the anchor text associated with backlinks to the page. This approach has several advantages in this context. First, anchors often provide more accurate descriptions of web pages than the pages themselves. Second, anchors may exist for images, programs, and other objects that cannot be indexed by a text-based search engine. This also makes it possible to return web pages which have not actually been crawled. In addition, the engine can compare the search terms with a list of its backlink document titles. Thus, even though the text of the document itself may not match the search terms, if the document is cited by documents whose titles or backlink anchor text match the search terms, the document will be considered a match. In addition to or instead of the anchor text, the text in the immediate vicinity of the backlink anchor text can also be compared to the search terms in order to improve the search.

Once a set of documents is identified that match the search terms, the list of documents is then sorted with high ranking documents first and low ranking documents last. The ranking in this case is a function which combines all of the above factors such as the objective ranking and textual matching. If desired, the results can be grouped by category or site as well.

It will be clear to one skilled in the art that the above embodiments may be altered in many ways without departing from the scope of the invention. Accordingly, the scope of the invention should be determined by the following claims and their legal equivalents.

What is claimed is:

1. A method performed by a computer, the method comprising:

selecting, by the computer, a first document from a plurality of documents stored in a database;

generating, by the computer, a rank for the first document using:

$$R = \frac{\alpha}{N} + (1-\alpha)\left(\frac{r(B_1)}{|B_1|} + \ldots + \frac{r(B_n)}{|B_n|}\right),$$

where
- R refers to the rank for the first document,
- n refers to a value greater than or equal to one,
- $B_1, \ldots, B_n$ refer to one or more second documents, of the plurality of documents, that include a link that points to the first document,
- $r(B_1), \ldots, r(B_n)$ refer to ranks for the one or more second documents,
- $|B_1|, \ldots, |B_n|$ refer to a quantity of links that the one or more second documents include,
- α refers to a constant that is greater than zero and less than one, and
- N refers to a total quantity of the plurality of documents; and storing, by the computer, the rank for the first document.

2. The method of claim 1, where α refers to a value in a finite range of values between zero and one.

3. The method of claim 1, where a refers to a probability that a user, when accessing a particular document of the one or more second documents, will randomly access another particular document, of the plurality of documents, rather than following the link to the first document,
the particular document being different from the other particular document.

4. The method of claim 1, further comprising:
performing a plurality of iterations of selecting the first document, generating the rank for the first document, and storing the rank for the first document.

5. The method of claim 1, further comprising:
repeating selecting a document, generating a rank, and storing the rank for each document of the plurality of documents stored in the database.

6. The method of claim 1, where the first document is from a first domain, and
where the one or more second documents include only documents from one or more second domains,
the one or more second domains being different from the first domain.

7. The method of claim 1, where the first document is hosted on a first web server,
where a particular document, of the one or more second documents, is hosted on the first web server and includes a first link to the first document,
where another particular document, of the one or more second documents, is hosted on a second web server and includes a second link to the first document, the second web server being different from the first web server,
where the method further comprises:
assigning a first weight to the first link based on the first document and the particular document being hosted on the first web server; and
assigning a second weight to the second link based on the first document being hosted on the first web server and the other particular document being hosted on the second web server,
the second weight being greater than the first weight;
where generating the rank for the first document includes:
generating the rank for the first document based on the first weight and the second weight.

8. The method of claim 1, where the first document is from a first domain,
where a particular document, of the one or more second documents, is from the first domain and includes a first link to the first document,
where another particular document, of the one or more second documents, is from a second domain and includes a second link to the first document, the second domain being different from the first domain,
where the method further comprises:
assigning a first weight to the first link based on the first document and the particular document being from the first domain; and
assigning a second weight to the second link based on the first document being from the first domain and the other particular document being from the second domain,
the second weight being greater than the first weight;
where generating the rank for the first document includes:
generating the rank for the first document based on the first weight and the second weight.

9. The method of claim 1, where the first document is associated with a first institution or author,
where a particular document, of the one or more second documents, is associated with the first institution or author and includes a first link to the first document,
where another particular document, of the one or more second documents, is associated with a second institution or author and includes a second link to the first document, the second institution or author being different from the first institution or author,
where the method further comprises:
assigning a first weight to the first link based on the first document and the particular document being associated with the first institution or author; and
assigning a second weight to the second link based on the first document being associated with the first institution or author and the other particular document being associated with the second institution or author,
the second weight being greater than the first weight;
where generating the rank for the first document includes:
generating the rank for the first document based on the first weight and the second weight.

10. The method of claim 1, where a particular document, of the one or more second documents, includes a first link to the first document and a second link to a third document,
the third document being different from the first document,
the first link being associated with a first measure of importance within the particular document,
the second link being associated with a second measure of importance within the first particular document,
the first measure of importance being greater than the second measure of importance,
where the method further comprises:
assigning a first weight to the first link based on the first measure of importance; and assigning a second weight to the second link based on the second measure of importance,
the first weight being greater than the second weight;
where generating the rank for the first document includes:
generating the rank for the first document based on the first weight.

11. The method of claim 1, where a particular document, of the one or more second documents, includes a first link to the first document,
where another particular document, of the one or more second documents, includes a second link to the first document, the particular document being associated with a first date on which the particular document was last modified, the other particular document being associated with a second date on which the other particular document was last modified, the first date being more recent than the second date, where the method further comprises:

assigning a first weight to the first link based on the first date; and assigning a second weight to the second link based on the second date, the first weight being greater than the second weight;

where generating the rank for the first document includes:

generating the rank for the first document based on the first weight and the second weight.

12. The method of claim 1, further comprising:

identifying that the first document is associated with a home page or a bookmark of a user; and setting a value for $\alpha$ based on identifying that the first document is associated with a home page or a bookmark of the user.

13. The method of claim 1, further comprising:

obtaining real usage data relating to accesses of the plurality of documents; and setting a value for a using the real usage data.

14. The method of claim 1, further comprising:

receiving a search query;

locating a set of documents, from the plurality of documents, based on the search query, the set of documents including the first document; and sorting documents, in the set of documents, into a ranked list, the first document being placed, within the ranked list, based on the rank for the first document.

15. The method of claim 14, further comprising:

determining categories associated with the documents in the set of documents; and arranging the documents, in the ranked list, based on the determined categories associated with the documents, a third document and a fourth document, of the documents, being associated with a same category of the determined categories, the third document and the fourth document being grouped together within the ranked list based on the third document and the fourth document being associated with the same category.

16. The method of claim 14, further comprising:

determining sites associated with the documents in the set of documents; and arranging the documents, in the ranked list, based on the determined sites associated with the documents, a third document and a fourth document, of the documents, being associated with a same site of the determined sites, the third document and the fourth document being grouped together within the ranked list based on the third document and the fourth document being associated with the same site.

17. The method of claim 1, further comprising:

receiving a search query;

locating a set of documents, from the plurality of documents, based on the search query, the set of documents including the first document;

determining relevance ranks for documents, in the set of documents, based on a match of the search query to contents of the documents;

determining a total rank for the first document based on the rank and the relevance rank for the first document; and sorting the documents, in the set of documents, into a ranked list, the first document being placed, within the ranked list, based on the total rank for the first document.

* * * * *